Feb. 19, 1952 — W. A. FRANTA — 2,586,322
PROCESS FOR CONTROLLING CHAIN-BRANCHING
DURING ETHYLENE POLYMERIZATION
Filed June 3, 1950
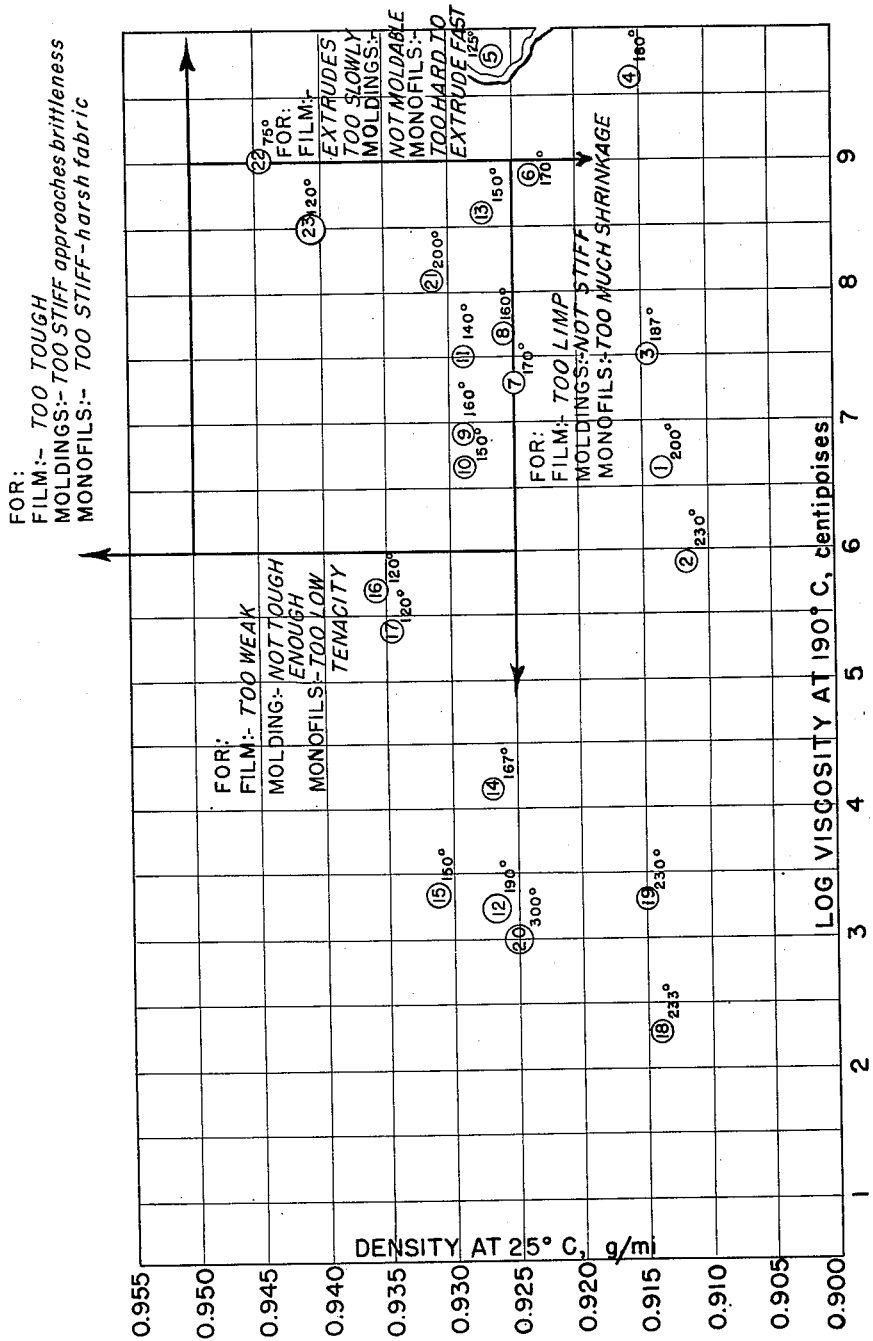
INVENTOR.
William A. Franta
BY
ATTORNEY Patented Feb. 19, 1952

2,586,322

UNITED STATES PATENT OFFICE 2,586,322

PROCESS FOR CONTROLLING CHAIN BRANCHING DURING ETHYLENE POLYMERIZATION

William A. Franta, Wilmington, Del., assignor to E. I. du Pont de Nemours and Company, Wilmington, Del., a corporation of Delaware Application June 3, 1950, Serial No. 165,925

2 Claims. (Cl. 260—94.9)

This invention relates to a process for the production of ethylene polymers of high density, having improved physical strength and is more particularly related to such polymers that have superior film, monofil and molding properties.

Commercially available grades of polymers of ethylene, although they have many desirable properties, do not possess adequate rigidity for some uses. According to papers read at the Atlantic City meeting of the American Chemical Society, in September 1949, there are at least two methods of obtaining a stiffer polymer for molding purposes: (A) by using a high molecular weight resin and (B) by the incorporation of suitable fillers. Since the stiffness of ethylene polymer is said to increase with increase in the molecular weight of the polymer, it would be expected, in order to provide a suitable polymer having the desired stiffness, it would be necessary merely to increase the molecular weight of the polymer. One accepted method of doing this is to lower the temperature used in preparing a polymer which when produced at higher temperatures has insufficient stiffness. When a high molecular weight polymer is produced, however, its inherently high melt viscosity is a serious handicap to its fabrication by molding, or by some other technique, to useful commercial articles. Fabrication difficulties and especially injection molding difficulties have heretofore increased with the increase in molecular weight which has been essential to attain any significant increase in stiffness. Decrease in reaction temperature, while giving polymers of increased molecular weight also gives an undesirable increase in melt viscosity so high, in fact, that the polymer cannot be successfully molded by commercial injection molding equipment. Furthermore, polymers of especially high molecular weight, because of their high melt viscosity, cannot easily be handled in continuous synthesis equipment and are, therefore, very troublesome and expensive to manufacture. The first proposed method, therefore, for increasing stiffness has many disadvantages. The second proposed method is equally unsatisfactory for the incorporation of fillers reduces toughness, imparts undesirable electrical properties and causes a major increase in the weight of a molding of given volume thereby decreasing the value of the polymeric products.

It has now been found that, contrary to much published information, ethylene polymers increase in stiffness not with increasing molecular weight but rather with increasing chain linearity. It is well known (Bryant—Journal of Polymer Science 2, pp. 547–564 [1947], No. 6) (Richards—Institute of Petroleum 34, pp. 237–254 [1948], No. 292) that polymers of ethylene, instead of being the simple linear hydrocarbons one would expect from the chemistry of vinyl polymerization, in their formation undergo more or less of a side reaction which introduces a certain variable degree of chain branching into the structure. The extent of this branching in a given polymer can be measured directly by infra-red spectrometry. It is well known that, after a standard thermal conditioning, polymers with less chain branching have a lower amorphous content (higher crystallinity) and that amorphous content, reflecting chain branching, can be measured quantitatively by X-ray diffraction or by precise density determinations. The stiffness and yield point of an ethylene polymer are independent, within wide limits, of its molecular weight, as measured by viscosity methods, but depends almost exclusively upon its linearity or chain branching, as measured by infra-red spectroscopy, X-ray diffraction, or density. It is preferable to use density for routine measurement of chain branching because of its convenience and high degree of precision and reproducibility. The reports in the literature which state that stiffness increases with molecular weight are based on the coincidence that, in common polymer synthesis practice, higher molecular weights are generally attained by lowering synthesis temperature and that this lowering of synthesis temperature concurrently increases the linearity, density and stiffness of the product. It has not ever heretofore been disclosed how one could control independently the molecular weight and the linearity of ethylene polymers, or indeed precisely why it is desirable to do so.

An object of the present invention is to provide a process for the preparation of polymers of ethylene having improved stiffness and improved workability. Another object of the invention is to provide polymers of ethylene having relatively high density, high stiffness and relatively low melt viscosity. Yet another object is to provide high density, macromolecular polymers of ethylene that can be injection molded with the same facility as polymers of lower density or polymers of the same melt viscosity or molecular weight with lower stiffness. Still another object is to provide films, monofils and plastic articles molded or extruded from polymers of ethylene that have superior properties. Other objects and advantages of the invention will hereinafter appear.

The above and other objects are accomplished in accord with the invention by controlled polymerization of ethylene to provide a polymer of high density, 0.925 to 0.950, and high stiffness, better than about 30,000 pounds per square inch (p. s. i.), but having a melt viscosity suitable for molding operations, i. e. a "log viscosity" between 6 and 9 where log viscosity is defined as the $\log_{10}$ of the melt viscosity at 190° C. in centipoises. This anomalistic result can be obtained if the polymerization of ethylene is carried out under known pressure and temperature conditions and with accepted catalysts that give high density polymers having high stiffness, providing such processes are conducted in the presence of prescribed amounts of cyclohexane. This compound, which appears to act as a chain transfer agent when present during the polymerization, controls chain growth and if it is present in proper amounts will give a polymer of high density, high stiffness and, nevertheless, a polymer having a sufficiently low melt viscosity to permit rapid and satisfactory molding.

Polymers of ethylene having high density, high stiffness and satisfactory moldability are produced by any suitable process in which a polymer of high density, high molecular weight and high melt viscosity can be produced. For example, it is known that high density, very high molecular weight polymers having a log viscosity of about 10 can be made by polymerizing ethylene at 1200 atmospheres under a temperature of 160° C. with diethyl peroxide as the catalyst. This polymer, however, has too high a melt viscosity for commercial molding operations. A log viscosity for such purposes should range between about 6 and 9 on the above basis. There is no known prior art process teaching how to convert a polymer having a log viscosity of 10 to a polymer having a log viscosity between 6 and 9 while retaining the original high density and stiffness. Extensive research has uncovered a process, however, wherein this result can be obtained. By conducting the polymerization of ethylene in accord with the invention and with from 0.05% to 15% of cyclohexane based on the weight of ethylene, a polymer can be produced having substantially the same density and substantially the same stiffness as the aforesaid polymer but with a log viscosity between 6 and 9. If smaller amounts are used stiffness is unsatisfactory, if larger amounts molecular weight and toughness decrease. The process of the invention, accordingly, makes it possible to provide for the first time, and by the use of cyclohexane during polymerization, polymers of ethylene having ratios of properties, viz. density/molecular weight/melt viscosity which fits them for many new industrial uses.

In the table which follows are given a number of examples illustrating the invention in which parts are by weight unless otherwise indicated. Ethylene was polymerized in accord with the Examples 1 to 23 by processes in which $\frac{1}{16}''$ to $1\frac{1}{8}''$ diameter stainless steel tubes were used as the reactors. Ethylene was charged into the tube and processed therein in the presence of water, an inert organic solvent such as benzene or tertiary butanol (in some instances in the absence of such a solvent), with or without cyclohexane. The reaction was catalyzed by the well known ethylene polymerization catalysts described and was conducted at pressures between 1000 and 2000 atmospheres, at the temperatures indicated. The product was continuously discharged from the stainless steel reaction tube into an atmospheric pressure separator from which the solid and liquid were removed periodically by means of a let-down valve situated between the reaction tube and the separator.

Table

| Run | P. atm. | T | Initiator Kind | Initiator P.P.M.[1] | Lb. E Water Lb. C₂H₄ | Inert Solvent Kind | Inert Solvent lb./lb. E[2] | Cyclohexane, lb./lb. | Contact Time, Min. | Conversion, Per Cent | Log₁₀ Visc. at 190° C. | G./ml. Density | Olsen Stiffness, p. s. i. | Tensile Yield/break, p. s. i. | Elong., Per Cent | Softening Point, °C. |
|---|---|---|---|---|---|---|---|---|---|---|---|---|---|---|---|---|
| 1 | 1,200 | 200 | EP | 120 | 1.8 | Bz | 0.7 | | 3.5 | 23 | 6.6 | 0.914 | 17,000 | 1255/1830 | 695 | 88 |
| 2 | 1,200 | 230 | EP | 180 | 1.8 | Bz | 0.7 | | 3.5 | 25 | 5.88 | 0.912 | 15,000 | 1180/1305 | 645 | 81 |
| 3 | 1,200 | 187 | EP | 140 | 1.8 | Bz | 0.7 | | 3.5 | 20 | 7.5 | 0.915 | 17,000 | 1345/2040 | 650 | 91 |
| 4 | 1,200 | 180 | EP | 60 | 1.8 | Bz | 0.7 | | 3.5 | 10 | 9.65 | 0.9162 | 18,000 | 1435/2440 | 650 | 97 |
| 5 | 1,200 | 125 | A | 200 | 1.8 | Bz | 0.15 | | 6 | 6 | >10 | 0.929 | 38,000 | 2360/2600 | 595 | 109 |
| 6 | 1,200 | 170 | BP | 300 | 2.3 | Bz | 0.175 | 0.025 | 6 | 17 | 8.85 | 0.9242 | 30,000 | 1710/1955 | 510 | 94 |
| 7 | 1,200 | 170 | BP | 300 | 2.3 | Bz | 0.15 | 0.05 | 6 | 12 | 7.28 | 0.9251 | 31,000 | 1680/1680 | 520 | 96 |
| 8 | 1,200 | 160 | BP | 300 | 2.3 | Bz | 0.14 | 0.06 | 6 | 12 | 7.68 | 0.9263 | 32,500 | 1900/1900 | 370 | 105 |
| 9 | 1,200 | 160 | BP | 300 | 2.3 | Bz | 0.13 | 0.07 | 6 | 13 | 6.90 | 0.9294 | 38,000 | 2110/2110 | 140 | 104 |
| 10 | 1,200 | 150 | BP | 300 | 2.3 | Bz | 0.14 | 0.06 | 6 | 15 | 6.62 | 0.9292 | 38,000 | 2110/2110 | 100 | 105 |
| 11 | 1,200 | 140 | BP | 300 | 2.3 | Bz | 0.16 | 0.04 | 6 | 11 | 7.52 | 0.9292 | 38,000 | 2080/2080 | 200 | 105 |
| 12 | 1,200 | 190 | EP | 80 | 2.1 | Bz | 0.45 | 0.3 | 3.5 | 20 | 3.25 | 0.9268 | 36,000 | 1700/1700 | 30 | 64 |
| 13 | 1,200 | 150 | BP | 300 | 2.3 | Bz | 0.16 | 0.04 | 6 | 12 | 8.60 | 0.9277 | 36,000 | 1900/2010 | 540 | 107 |
| 14 | 1,200 | 167 | EP | 225 | 2.1 | Bz | 0.1 | 0.2 | 3.5 | 15 | 4.18 | 0.927 | 35,000 | 1700/1700 | 0 | 75 |
| 15 | 1,200 | 150 | EP | 400 | 2.3 | | | 0.6 | 6 | 5 | 3.35 | 0.9314 | 42,000 | | | |
| 16 | 1,200 | 120 | BP | 200 | 0.64 | | | 0.1 | 5 | 14 | 5.73 | 0.9360 | 56,000 | 2450/2450 | 50 | 105 |
| 17 | 1,200 | 120 | BP | 300 | 0.64 | | | 0.12 | 5 | 16 | 5.39 | 0.9349 | 51,000 | 2400/2400 | 50 | 102 |
| 18 | 1,200 | 233 | EP | 350 | 2.1 | | | 0.43 | 7 | 26 | 2.3 | 0.9124 | 16,000 | | | |
| 19 | 1,200 | 230 | EP | 380 | 3.1 | | | 0.18 | 7 | 40 | 3.3 | 0.9149 | 18,000 | | | |
| 20 | 2,000 | 300 | EP | 25 | | Bz | 0.2 | 0.1 | 0.6 | 15 | 3.6 | 0.92 | 23,000 | 1410/1410 | 80 | |
| 21 | 2,000 | 200 | EP | 27 | | Bz | 0.2 | 0.1 | 0.9 | 17 | 5.0 | 0.92 | 23,000 | 1455/1455 | 110 | |
| 22 | 1,000 | 75 | PP | 1,300 | 1.9 | | | 0.2 | 4.3 | 5 | 6.1 | 0.950 | 85,000 | | | |
| 23 | 1,200 | 120 | EPC | 190 | 2.4 | Bz | 0.1 | 0.55 | 3.5 | 2 | 8.45 | 0.941 | 60,000 | | | |

A = Azo bis diisobutyronitrile.
BP = Benzoyl peroxide.
Bz = Benzene.
EP = Diethyl peroxide.
EPC = Diethyl peroxydicarbonate.
PP = Perfluorobutyryl peroxide.
[1] Parts per million parts of ethylene.
[2] Pounds per pound of ethylene.

The density used in this application was determined on a 70 mil thick specimen of the ethylene polymer which was molded between metal plates in a press at a temperature of 165° C. After molding, the specimen was cooled in the press while under pressure by running cooling water through the press platens. The specimen was then held at 25° C. ±1° C. for 24 hours, ±4 hours before measuring its density. The density was determined by flotation in a liquid having a specific gravity adjusted to float the specimen. By this method present commercial molding grades of polythene have densities of 0.915 ± 0.001.

While the examples illustrate the use of several catalysts for the reaction others may be used such, for example, as the dialkyl dioxides generally and more particularly methyl ethyl peroxide and ditertiary butyl peroxide. Other catalysts of the art may likewise be used such, for example, as hydrogen peroxide, persuccinic acid, lauryl peroxide, the percarbamates, urea peroxide, alkali metal and alkaline earth metal and ammonium persulfates, perborates, percarbonates, the azo catalysts and other well known catalysts for the reaction.

The preferred reaction for producing these superior polymers is carried out in the presence of water and/or an inert solvent and a chain transfer agent. Suitable inert solvents for the reaction are benzene, chlorobenzene, and tertiary butanol. The solvents are chemically inert, have little effect upon the course of the polymerization reaction and leave the reaction substantially unchanged.

While the reaction has been described as taking place in water and by a continuous process, it may be conducted discontinuously or by a process in which the ethylene is polymerized in the presence of the proper amount of the chain transfer agent in an emulsion. Other suitable methods of conducting the reaction may be employed providing the agent is present in the amounts necessary to provide the high density, high stiffness and the desired melt viscosity polymer.

In the drawing accompanying this application is illustrated, by way of a graph, the polymers covered by the invention. Along the Y axis, density at 25° C. in grams per milliliter is plotted against log viscosity$_{10}$ at 190° C. in centipoises plotted on the X axis. Also on this chart are spotted, by corresponding numbers, the polymers of the table. It will be noted that polymers designated as runs 1, 2, 3 and 4 have a density below about .915 although all except 4 have a satisfactory melt viscosity. By reference to the table it will be noted also that these polymers have a stiffness between 15,000 and 18,000 p. s. i. In the preparation of these polymers no cyclohexane was employed and the products are not as stiff as is desired. The products of the invention, runs 7, 8, 9, 10, 11, 13, 21, 22, and 23 are included, run 6 almost included, in the rectangle bounded by log viscosity between 6 and 9 and between densities of 0.925 and 0.95. These polymers are superior for the preparation of films, monofils and molding compositions. The other polymers described in the table and in the drawing are not included within the purview of the invention but illustrate polymers outside its scope.

As is noted on the graph, if the polymer density is greater than 0.950 films are not tough enough. If the polymer density is less than 0.925 the film is too limp. At the other extremes, if the log viscosity is less than 6 the film is too weak, if greater than 9 it extrudes at such a slow rate that commercial production is uneconomical. These polymers are also superior for the preparation of monofils for polymers of ethylene having a density greater than 0.95 give harsh fabrics, while with a density of less than 0.925 the shrinkage of the monofil at 90° C. is so great that it limits the utility of the fabrics woven therefrom. With log viscosities less than 6 the monofil has much too low a tenacity and with log viscosities greater than 9 it is too hard to extrude with acceptable commercial speed. With regard to the molding properties of the polymers, the polymers of the invention have superior moldability. If the density is greater than 0.95 the polymer becomes too stiff and approaches brittleness. With a density below 0.925 the polymer is not stiff enough for many commercial uses. The polymers having log viscosities below 6 are not sufficiently tough for general utility and polymers having log viscosities greater than 9 are not moldable with commercial equipment available today.

The polymers of the invention are adapted for injection molding to give articles of intricate shapes with no appreciable flashing and/or mold sticking. Moreover, these polymers mold into articles having superior surfaces in comparison with polymers of ethylene heretofore used.

I claim:

1. In a process for the preparation of a homopolymer of ethylene having a density between 0.925 and 0.950, a stiffness greater than 30,000 p. s. i. and a log$_{10}$ melt viscosity in centipoises at 190° C. of between 6 and 9, the step which comprises polymerizing ethylene at a temperature of approximately 140° C. under a pressure of approximately 1200 atmospheres, there being present during the polymerization per part by weight of ethylene 300 P. P. M. of benzoyl peroxide, 2.3 parts of water, 0.16 part of benzene and 0.04 part of cyclohexane.

2. In a process for the preparation of a homopolymer of ethylene having a density between 0.925 and 0.950, a stiffness greater than 30,000 p. s. i. and a log$_{10}$ melt viscosity at 190° C. between 6 and 9 centipoises, the step which comprises conducting the polymerization in the presence of water at a temperature between 150° and 200° C. under a pressure between 1200 and 2000 atmospheres, in the presence of an ethylene polymerization catalyst and from 0.05 to 15 parts by weight of cyclohexane per 100 parts by weight of ethylene.

WILLIAM A. FRANTA.

REFERENCES CITED

The following references are of record in the file of this patent:

UNITED STATES PATENTS

| Number | Name | Date |
|---|---|---|
| 2,395,327 | Hanford | Feb. 19, 1946 |
| 2,497,323 | Roedel | Feb. 14, 1950 |